(12) United States Patent
Matsumoto et al.

(10) Patent No.: US 6,648,952 B1
(45) Date of Patent: Nov. 18, 2003

(54) ANTHRAPYRIDONE COMPOUND, AQUEOUS MAGENTA INK COMPOSITIONS AND INK-JET RECORDING METHOD

(75) Inventors: Hiroyuki Matsumoto, Saitama (JP); Yasuo Murakami, Saitama (JP); Junko Yoshioka, Tokyo (JP); Yasuo Shirasaki, Saitama (JP); Katsunori Fujii, Saitama (JP)

(73) Assignee: Nippon Kayaku Kabushiki Kaisha, Tokyo (JP)

(*) Notice: Subject to any disclaimer, the term of this patent is extended or adjusted under 35 U.S.C. 154(b) by 63 days.

(21) Appl. No.: 10/018,613
(22) PCT Filed: Aug. 28, 2000
(86) PCT No.: PCT/JP00/05792
§ 371 (c)(1),
(2), (4) Date: Dec. 17, 2001
(87) PCT Pub. No.: WO01/18123
PCT Pub. Date: Mar. 15, 2001

(30) Foreign Application Priority Data

Sep. 3, 1999 (JP) .......................... 11-250855

(51) Int. Cl.⁷ .................. C09D 11/00; C09D 11/02; C09B 5/14; C07D 221/18; B41J 2/01
(52) U.S. Cl. .................. 106/31.47; 106/31.77; 8/658; 546/76; 347/100
(58) Field of Search .................. 106/31.47, 31.77; 8/658; 546/76; 347/100

(56) References Cited

U.S. PATENT DOCUMENTS

| 2,644,821 A | 7/1953 | Basel et al. ............ 260/278 |
| 6,471,760 B1 * | 10/2002 | Matsumoto et al. ...... 106/31.47 |
| 6,481,841 B1 * | 11/2002 | Blease et al. ........... 347/100 |
| 6,530,985 B1 * | 3/2003 | Matsumoto et al. ...... 106/31.47 |

FOREIGN PATENT DOCUMENTS

| EP | 0 270 306 | 6/1988 |
| EP | 0 927 747 | 7/1999 |
| JP | 59-74173 | 4/1984 |
| JP | 2-16171 | 1/1990 |
| JP | 3-100502 | 4/1991 |
| JP | 8-29771 | 2/1996 |
| WO | 99/46341 | 9/1999 |

* cited by examiner

Primary Examiner—Helene Klemanski
(74) Attorney, Agent, or Firm—Nields & Lemack (57) ABSTRACT

The present invention relates to anthrapyridone disulfonic acid represented by Formula (1) as shown below or the salt thereof, a water-based magenta ink composition containing the same, and a method for ink-jet recording by using the same.

The compound of the present invention is excellent in water-solubility. The magenta ink composition containing the compound has a good storage stability. The product recorded by the ink-jet recording method appears with a vivid and reproducible hue, and has high light fastness and water fastness.

(1)

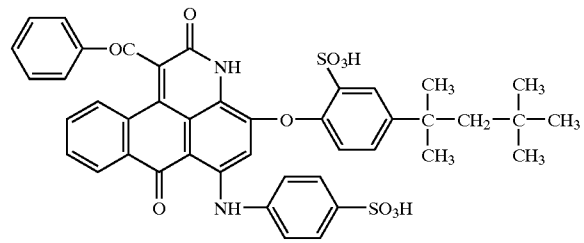

14 Claims, 1 Drawing Sheet

ANTHRAPYRIDONE COMPOUND, AQUEOUS MAGENTA INK COMPOSITIONS AND INK-JET RECORDING METHOD

TECHNICAL FIELD

The present invention relates to an ink composition, more particularly, to a water-soluble magenta ink composition for ink-jet recording comprising a anthrapyridone compound or the salt thereof that has a wide color range and is excellent in color tone, light fastness and water fastness; and a method of ink-jet recording thereby.

BACKGROUND ART

Diverse ink jetting processes have been developed for the recording method by means of ink-jet printer, and any processes comprise generating ink droplets to deposit onto various recording materials (such as paper, film, cloth) for recording. The recording method by means of ink-jet printer has rapidly been spread in recent years and will be propagated in future because the method brings about no noise due to the system in which a recording head does not contact with the recording material and because the method advantageously allows the printer to become downsized, to work in a high-speed and to give color printing, easily. In order to record in color an image information or a character information on a computer color display by an ink-jet printer, the information is generally printed by subtractive color mixing of inks of four colors, namely yellow(Y), magenta(M), cyan(C) and black(K). In order to print reproducibly an image pictured by additive color mixing of R(red), G(green), B(blue) on a CRT display as identical as possible by subtractive color mixing, the dyes used therefor, especially the ones for a YMC ink, are desired to have color hues close to the respective standards of YMC("Japan Color Standard Paper" published by Japan Printing Machinery Manufacturers Association)and vividness. Additionally, it is required that the resulting ink composition is stable for long-term storage and that the resulting printed image is of a high optical density and has excellent fastness including water fastness, light fastness, and outdoor exposure fastness. Outdoor exposure fastness is a complex fastness to light and atmospheric gas such as the oxide gas of nitrogen or sulfur and ozone.

The present invention relates to a magenta ink.

The uses of ink-jet printers are enlarged from a small one for office use to a big one for industry. So, excellence in fastness such as water fastness and light fastness of the printed image is more keenly demanded. The water fastness of an article recorded by ink-jet printing has been improved substantially by coating inorganic or organic micro particles such as cationic polymer, porous silica, alumina sol and special ceramics which can absorb dye from ink, on a paper sheet together with the resins such as PVA resin. Various coated sheets for ink-jet printing are already available on the market. But light fastness has not yet been largely improved by any established technique. Magenta, one of tetrachromatic colors of YMCK, of which dyes are originally poor in light fastness, and the improvement is an important problem to be solved. Further, the articles recorded by magenta dyes have been found to fade in color while being exposed to light and air, possibly because of the influences of the various gasses existing in nature.

The chemical structure of magenta dyes used in a water-soluble ink for ink-jet recording are a xanthene type disclosed by JP Laid-Open No.89811/1979, JP Laid-Open No.60053/1996 and JP Laid-Open No.143798/1996, and an azo type using the H acid disclosed by JP Laid-Open No.62562/1986, JP Laid-Open No.156168/1987, JP Laid-Open No.203970/1991, JP Laid-Open No.157698/1995 and JP Publication No.78190/1995. The xanthene type is indeed excellent in hue and vividness, but is very inferior in light fastness. Some of the azo type using the H acid are good in hue and water fastness, but are inferior in light fastness and vividness. As disclosed by JP Laid-Open No.203970/1991, magenta dyes having excellent vividness and light fastness have been developed in this type, but are still inferior in light fastness to the dyes of other colors such as azo yellow dyes and cyan dyes represented by copper phthalocyanine type.

Furthermore, for a chemical structure of magenta dyes having excellent vividness and light fastness, an anthrapyridone type is known as disclosed by JP Laid-Open No.195775/1982, JP Laid-Open No.74173/1984 and JP Laid-Open No.16171/1990 but is not yet able to satisfy all of the properties such as the range of color, hue, vividness, light fastness, water fastness and stability in solution. An anthrapyridone compound is described as a dye having good light fastness and water fastness in U.S. Pat. No. 2,644,821. However, it is a dye mainly for fiber dyeing and can not provide a high quality ink suitable for ink-jet recording.

An object of the present invention is to provide a water-based magenta ink composition which has hue of a wide color range and vividness suitable for ink-jet recording and gives the recorded material with a high fastness and a magenta dye suitable therefor.

DISCLOSURE OF THE INVENTION

The present inventors made a diligent study to solve the above problem and, as a result, have completed the present invention. Namely, the present invention is as follows:

(1) An anthrapyridone disulfonic acid represented by Formula (1) or the salt thereof (1)

(2) A dye mixture being obtained by sulfonating the anthrapyridone compound represented by Formula (2), comprising the disulfonic acid product of the anthrapyridone compound represented by Formula (2) or the salt thereof and the monosulfonic acid product of the anthrapyridone compound represented by Formula (2) or the salt thereof.

(2)

(3) A dye mixture according to the above (2), wherein said disulfonic acid product of the anthrapyridone compound represented by Formula (2) or the salt thereof has a content of 85% or more and said monosulfonic acid product of the anthrapyridone compound represented by Formula (2) or the salt thereof has a content of 10% or less, when determined from their area ratios by high performance liquid chromatography (HPLC).

(4) A dye mixture according to the above (3), wherein said disulfonic acid product of the anthrapyridone compound represented by Formula (2) or the salt thereof has a content of 90% or more and said monosulfonic acid product of the anthrapyridone compound represented by Formula (2) or the salt thereof has a content of 5% or less, when determined from their area ratios by high performance liquid chromatography (HPLC).

(5) A dye mixture according to any one of the above (2) to (4) comprising an inorganic salt having a content of 1% by mass or less.

(6) A dye mixture according to any one of the above (2) to (5), wherein one of said disulfonic acid product of the anthrapyridone compound represented by Formula (2) is the anthrapyridone disulfonic acid represented by Formula (1).

(7) A method for producing the anthrapyridone disulfonic acid or the salt thereof according to the above (1), characterized in that the anthrapyridone compound represented by Formula (2) is disulfonated with fuming sulfuric acid, followed by salting out the obtained reaction solution by a conventional way to get a wet cake, which is then treated with hydrous lower alcohol.

(8) A method for producing the dye mixture according to any one of the above (2) to (6), characterized in that the anthrapyridone compound represented by Formula (2) is sulfonated with fuming sulfuric acid, followed by salting out the obtained reaction solution comprising the disulfonic acid product and the monosulfonic acid product of the anthrapyridone compound represented by Formula (2) by a conventional way.

(9) A water-based magenta ink composition that contains the anthrapyridone disulfonic acid according to the above (1) or the salt thereof.

(10) A water-based magenta ink composition that contains the dye mixture according to any one of the above (2) to (6).

(11) A water-based magenta ink composition according to the above (9) or (10), wherein said composition contains water and an organic solvent.

(12) A water-based magenta ink composition according to any one of the above (9) to (11), wherein said composition is prepared for ink-jet recording.

(13) A method for ink-jet recording that ink droplets are ejected responding to record signals to record onto a recording material, comprising using the water-based magenta ink composition according to any one of the above (9) to (12) as a magenta ink.

(14) A method for ink-jet recording that ink droplets are ejected responding to record signals to record onto a recording material, comprising using the water-based magenta ink composition according to any one of the above (9) to (12) as a magenta ink and using a water-based cyan ink composition containing a water-soluble metal phthalocyanine dye as a cyan ink.

(15) A method for ink-jet recording according to the above (13) or (14), wherein said recording material is a fiber material having polyamide groups and the fiber material is treated by heat after said ink droplets are ejected on it.

(16) A method for ink-jet recording according to any one of the above (13) to (15), wherein said recording material is an information transmission sheet.

(17) A method for ink-jet recording according to the above (16), wherein said information transmission sheet is a surface-finished sheet.

(18) An ink-jet printer that comprises being equipped with a container containing the water-based magenta ink composition according to any one of the above (9) to (12) and further a container containing a water-based cyan ink composition containing a water-soluble metal phthalocyanine dye.

DESCRIPTION OF SYMBOLS

Figure 1:
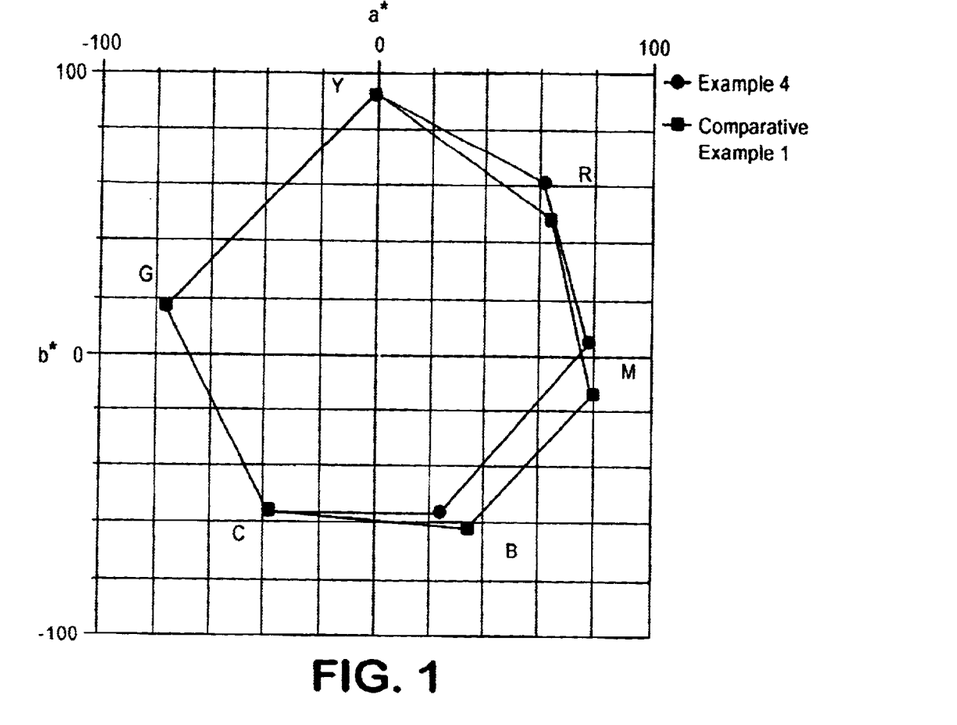
FIG. 1 is a diagram (chromaticity diagram) showing the results obtained by printing the blend colors in Example 4 and Comparative Example 1.

In FIG. 1, the axis X represents a* value and the axis Y represents b* value on the L* a* b* colorimetric system. Y shows yellow, R shows red, M shows magenta, B shows blue, C shows cyan and G shows green. The solid line expresses the color range of the ink composition of Example 4 and the dotted line expresses the color range of the ink composition of Comparative Example 1.

Figure 2:
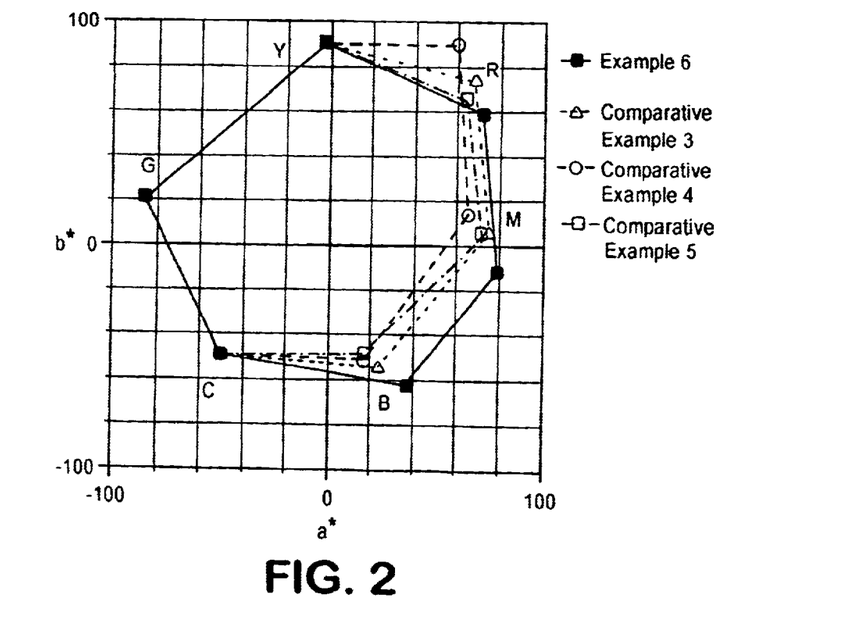
FIG. 2 is a diagram (chromaticity diagram) showing the color range of the dyes.

In FIG. 2, the axis X represents a* value, and the axis Y represents b* value on the L* a* b* colorimetric system. Y shows yellow, R shows red, M shows magenta, B shows blue, C shows cyan and G shows green. The solid line expresses the color of the printed product in Example 6 and the dotted lines express the color ranges of the printed products in Comparative Example 3, 4 and 5.

BEST MODE FOR CARRYING OUT THE INVENTION

The anthrapyridone disulfonic acid represented by above Formula (1) of the present invention or the salt thereof can be obtained for example by sulfonating the compound represented by above Formula (2) in sulfuric acid containing fuming sulfuric acid. The concentration of fuming sulfuric acid in sulfuric acid is 5–12% by mass, preferably 6–10% by mass. The reaction temperature is generally 0–60° C. preferably 10–30° C. The reaction time, though it varies depending on the reaction temperature, is generally 5 minutes–20 hours, 30 minutes–5 hours under the preferable condition. The progress of the sulfonation reaction can be traced by high performance liquid chromatography (HPLC).

The disufonic acid product of the compound represented by above Formula (2) is not always needed to be pure to use for preparing the ink composition of the present invention. Namely, the dye mixture, which is obtained by sulfonating the compound represented by above Formula (2) and contains the disulfonic acid product of the compound represented by above Formula (2) as the principal component, can be used even if it contains the monosulfonic acid product of the compound represented by above Formula (2). Such a dye mixture can be produced, for example, by sulfonating the compound represented by above Formula (2) in sulfuric acid containing fuming sulfuric acid. The concentration of fuming sulfuric acid in sulfuric acid is 5–12% by mass, preferably 6–10% by mass. The reaction temperature is generally 0–60° C. preferably 10–30° C. The reaction time is generally 5 minutes–20 hours. The degree of sulfonation is examined in terms of area ratio by high performance liquid chromatography (HPLC). The reaction is terminated when the compound represented by above Formula (2) disappears and the monosulfonic acid product decreases to a concentration of about 10% by mass or less. After the reaction is terminated, the reaction solution is poured into ice water, salted out, filtered, and dried to get a dye mixture containing the targeted disulfonic acid product or the salt thereof as the principal component. The disulfonic acid product or the salt thereof thus obtained comprises mainly the anthrapyridone disulfonic acid represented by above Formula (1) or the salt thereof. The other components contained in the obtained dye mixture include the monosulfonic acid product of the compound represented by above Formula (2) or the salt thereof and inorganic salts.

The content of the monosulfonic acid product is preferably as low as possible for the facility of production (such as filterability) of an ink, the storage stability of an ink, and the vividness of a recorded product and is 10% or less (including 0%), preferably 5% or less, more preferably 2% or less, most preferably 1% or less, when determined from area ratios by high performance liquid chromatography for example. The content of the dinosulfonic acid product of the compound represented above by Formula (2) or the salt thereof is 85% or more, preferably 90% or more, more preferably 92% or more, most preferably 95% or more, when determined from area ratios by high performance liquid chromatography.

For the dinosulfonic acid product of the anthrapyridone compound represented by above Formula (2) or the salt thereof, the compound represented by above Formula (1) of the present invention (the anthrapyridone disulfonic acid represented by above Formula (1) or the salt thereof) is preferable because it is easy to be manufactured and suitable for an ink composition and so on.

The measurement condition of high performance liquid chromatography (HPLC) was as follows.
Column: Inertsil ODS-2, inner diameter 6 mm, length 150 mm I.D. (Internal Diameter), Mobile phase: acetonitrile:0.05% by mass of ammonium dihydrogenphosphate=40:60(% by mass), Flow rate: 0.8 ml/min, Temperature: 40° C., Detector: UV-254 nm.

A compound or a dye mixture of the present invention to use has preferably an inorganic salt content as low as possible for preparing an ink composition of the present invention. The aiming total content of sodium chloride and sodium sulfate, for example, in the compound or the dye mixture of the present invention is 1% by mass or less, preferably 0.5% by mass or less.

The content of inorganic salts can be determined respectively as follows: $Cl^-$ and $SO_4^{2-}$ by ion chromatography; a heavy metal ion by atomic absorption spectrometry or ICP(Inductively Coupled Plasma)emission spectrometry; $Ca^{2+}$ and $Mg^{2+}$ by ion chromatography, atomic absorption spectrometry or ICP emission spectrometry.

The compound or the dye composition of the present invention is preferably treated with a lower alcohol such as methanol and ethanol if necessary so that it may have an inorganic salt content as low as possible for preparing an ink composition of the present invention. The other desalting treatment includes a conventional method using reverse osmotic membrane and a method that a dry product or a wet cake, preferably a wet cake, of the dye component of the present invention (the compound or the dye composition of the present invention) is stirred in a solvent such as hydrous lower alcohol, preferably in a mixture solvent of methanol with water, then filtered and dried. Any of them is applicable, however, the latter method is more preferable. In the latter method, the solvent amount (mass) is about 1–20 times, preferably about 2–10 times as much as the dry product or the wet cake. The treating time, though not particularly limited because it varies depending on the amount to treat, the amount of hydrous lower alcohol and any other conditions, is generally several minutes to several hours, preferably about 10 minutes–3 hours. The treating temperature, though not particularly limited, is generally about 10–40° C., preferably about room temperature. The alcohol content in the hydrous lower alcohol is generally about 20–95% by mass, preferably 50–90% by mass, more preferably 70–85% by mass.

The compound or the dye mixture of the present invention can exist as a free acid or the salt thereof. The salt can be used as the alkali metal salt, an alkali earth metal salt, an alkylamine salt, an alkanolamine salt or an ammonium salt. The preferable salts are an ammonium salt; an alkali metal salt such as the sodium salt, the potassium salt and the lithium salt; and an alkanolamine salt such as the monoethanolamine salt, the diethanolamine salt, the triethanolamine salt, the monoisopropanolamine salt, the diisopropanolamine salt and the triisopropanolamine salt. The sodium salt for example can be obtained by adding the sulfonation reaction solution into ice water after sulfonating, then salting out with sodium chloride and filtering. The sodium salt is dissolved in water, followed by acidifying the solution with an acid to deposit a crystal, and then filtered to obtain a wet cake of dye as the free acid. Then, the dye in the form of the free acid is dissolved or suspended in water, followed by adding and dissolving a base corresponding to the objective salt such as an amine or a compound of other alkali metal than sodium to get a solution of each salt. Other salts than the sodium salt can be obtained conventionally by depositing from the solution, filtering and drying.

The water-based ink composition of the present invention can be obtained by dissolving the above dye component in water or an aqueous solvent(water containing a water-soluble organic solvent which will be described later). The preferable ink pH is about 6 to 11. As described above, for use in an ink-jet recording printer, it is preferable to use a dye component containing an inorganic salt such as the chloride and the sulfate of a metal positive ion, as little as possible when using for an ink-jet recording printer.

The water-based ink composition of the present invention is prepared by using water as a medium, containing the dye component preferably by 0.1 to 20% by mass, more preferably by 1 to 10% by mass, further more preferably 2 to 8% by mass. The water-based ink composition of the present invention also may contain a water-soluble organic solvent in about 60% by mass or less, preferably in about 50% by mass or less, more preferably in about 40% by mass or less, further more preferably in about 30% by mass or less. The minimum amount may be 0%, however, it generally contain in about 5% by mass or more, preferably in about 10% by mass or more and most preferably in 10–30% by mass. The water-based ink composition of the present invention also may contain the additives for preparation of ink in about 0 to 10% by mass, preferably by 5% by mass or less. The remainder is water.

The usable water-soluble organic solvent includes a C1–C4 alkanol such as methanol, ethanol, propanol, isopropanol, butanol, isobutanol, secondary butanol and tertiary butanol; a lower carboxylic (mono or di)lower alkylamide such as N,N-dimethylformamide and N,N-dimethylacetoamide; a lactam, preferably a 4 membered ring to 8 membered ring of lactam such as ε-caprolactam and N-methylpyrrolidin-2-one; urea; a cyclic urea, preferably a 5–6 membered ring of cyclic urea such as 1,3-dimetylimidazolidin-2-one or 1,3-dimethyl hexahydropyrimid-2-one; a C4–C7 straight chain of ketone or keto-alcohol such as acetone, methyl ethyl ketone, and 2-methyl-2-hydroxypentan-4-one; an ether, preferably a 5–6 membered ring of cyclic ether such as tetrahydrofuran and dioxane; a mono-, oligo- or poly-alkylene glycol or thioglycol having C2–C6 alkylene units such as ethylene glycol, 1,2- or 1,3-propylene glycol, 1,2- or 1,4-butylene glycol, 1,6-hexylene glycol, diethylene glycol, triethylene glycol, dipropylene glycol, thiodiglycol, polyethylene glycol and polypropylene glycol; a polyol (preferably a C3–C6 chain of triol) such as glycerin and hexane-1,2,6-triol; a C1–C4 alkyl ether of polyhydric alcohol(preferably ethylene glycol or polyethylene glycol) such as ethylene glycol monomethyl ether, ethylene glycol monoethyl ether, diethylene glycol monomethyl ether, diethylene glycol monoethyl ether, triethylene glycol monomethyl ether, and triethylene glycol monoethyl ether; γ-butyrolactone; and dimethylsulfoxide. Some of these water-soluble organic solvents have the function of an auxiliary agent for dissolving dye.

Two or more of these solvents can be used together. The preferable solvents include water and N-methylpyrrolidin-2-one, a mono-, di- or tri-alkylene glycol having C2–C6 alkylene units (preferably mono-, di- or triethylene glycol, dipropylene glycol), and dimethylsulfoxide. The use of N-methylpyrrolidin-2-one, diethylene glycol, and dimethylsulfoxide are especially preferable.

The additives for preparation of the ink include all of the components excluding the water, the dye component and the water-soluble organic solvent described above. It includes such as a preservative, a pH-adjusting agent, a chelating reagent, a rust preventive, a water-soluble ultraviolet absorbing agent, a water-soluble polymer compound, and a surfactant. The preservative includes sodium dehydroacetate, sodium sorbate, sodium 2-pyridine thiol-1-oxide, sodium benzoate and sodium pentachlorophenolate. The pH-adjusting agent includes any substance that can control the ink pH within a range of 6 to 11 as long as it has no adverse effect on the ink preparation. The examples are alkanolamines such as diethanolamine and triethanolamine; alkali metal hydroxides such as lithium hydroxide, sodium hydroxide, and potassium hydroxide; ammonium hydroxide; or alkali metal carbonates such as lithium carbonate, sodium carbonate and potassium carbonate. The chelating reagent includes sodium ethylenediamine tetraacetate, sodium nitrilotriacetate, sodium hydroxylethylenediamine triacetate, sodium diethylenetriamine pentaacetate, and sodium uramil diacetate. The rust preventive includes acidic hyposulfite salts, sodium thiosulfate, ammonium thioglycolate, diisopropylammonium nitrite, pentaerythritol tetranitrate, and dicyclohexylammonium nitrite.

The ink composition of the present invention is prepared by adding the dye of the present invention into the impurity-free water such as distilled water and then mixing together with the above water-soluble organic solvent and the additives for preparation of the ink upon necessity. Alternatively, the dye of the present invention may be added in a mixture of water, the above water-soluble organic solvent and the additives for preparation of the ink to dissolve. The resulting ink composition may be filtered, if necessary, to remove the contaminants from the composition.

The aiming total content of sodium chloride and sodium sulfate, for example, as an inorganic salt in the ink composition of the present invention is preferably 0.1% by mass or less, and more preferably 0.05% by mass or.

A recording material used in ink-jet recording of the present invention includes an information transmission sheet such as paper and film, fiber and leather.

It is preferable that the information transmission sheet is surface-treated and, practically, is the one having an ink-acceptable layer on the basement material. The ink-acceptable layer can be made, for example, by impregnating or coating a cationic polymer on the above basement material; or by coating an inorganic fine-grain such as porous silica, alumina sol and special ceramic, which can absorb the dye from an ink, together with a hydrophilic polymer such as polyvinyl alcohol and polyvinyl pyrrolidone on the above basement material. The sheet having the ink-acceptable layer is generally called a special ink-jet paper (film) or a glossy paper (film), and is available on the market, for example, as Pictorico(by Asahi Glass KK), Color BJ Paper, Color BJ Photofilm sheet(by Canon KK), Color Image Jet special paper(by Sharp KK), Superfine special glossy film(by Seiko Epson KK)and Pictafine(by Hitachi Maxell KK). A plain paper can of course be used for a recording material.

The preferable fiber is a polyamide fiber such as nylon, silk and wool in the form of nonwoven fabric or cloth. The ink composition of the present invention is applied to the fiber, preferably by ink-jetting, followed by fixing by wet heating (for example, about 80–120° C.) or dry heating(for example, about 150–180° C.), so that the dye can be fixed inside the fiber to give a colord article having excellent grade in vividness, light fastness and washing fastness.

In order to record on a recording material by an ink-jet recording method of the present invention, a container containing the above water-based magenta ink composition is set in an ink-jet printer to record on the above recording material by a conventional method. The ink-jet printer includes a piezo system printer using a mechanical vibration and a bubble-jet system printer using bubble generated by heating.

In the ink-jet recording method of the present invention, the above water-based magenta ink composition can be used in combination with a yellow ink composition, a cyan ink composition, or a black ink composition if necessary. A water-based cyan ink composition as a cyan ink composition containing water-soluble metal phthalocyanine dye, if used in combination with the above water-based magenta ink composition shows less change in the color tone in the light fastness test executed after color blending.

The metal in the water-soluble metal phthalocyanine dye includes copper, nickel and aluminium. The copper is preferable. The water-soluble copper phthalocyanine dye includes C.I.Direct Blue 86, C.I.Direct Blue 87, C.I.Direct Blue 199, C.I.Acid Blue 249, C.I.Reactive Blue 7, C.I.R- eactive Blue 15, C.I.Reactive Blue 21, and C.I.Reactive Blue 71. The cyan ink composition containing the water-soluble metal phthalocyanine dye can be produced, for example, according to the method for producing the above water-based magenta ink composition, and then injected into a container. The container is set to use at the indicated position of an ink-jet printer in the same way as the container containing the water-based magenta ink composition.

The water-based ink composition of the present invention can give an ideal magenta color that has vividness, a color tone close to the one shown in the above Japan Color, high chroma and an appropriate bluishness. Therefore, the composition, if used together with a yellow or cyan ink, can give a wide range of color in visible color tone. Further, the composition, if used together with an existing yellow, cyan or black ink which is excellent in light fastness and water fastness, can provide a recorded product with excellent grade in light fastness and water fastness.

EXAMPLE

The present invention will be described below in more details with reference to Example. "part" and "%" in the description are shown by mass unless otherwise specified.

Example 1

48.4 parts of 32.5% fuming sulfuric acid was added to 54.4 parts of 96.5% sulfuric acid held in a reaction vessel under ice cooling to prepare 7% fuming sulfuric acid. 15.2 parts of the anthrapyridone compound of Formula (2) was added gradually to the 7% fuming sulfuric acid under ice cooling at a temperature of 20° C. or below, followed by sulfonating at 15–20° C. for 4 hours. The reaction solution was added in 400 parts of ice water, followed by adding 25 parts of sodium chloride under stirring and stirring for further 1 hour. The solution thus obtained was filtered and washed with 20 parts of 10% aqueous sodium chloride solution to get a wet cake, which was then stirred with 300 parts of water for 30 minutes and filtered to remove a small amount of undissolved product. 30 parts of sodium chloride was added under stirring in the mother liquor to salt out, followed by stirring for 1 hour, filtering, and drying to obtain a dye mixture containing the disulfonic acid product of the anthrapyridone compound of Formula (2) as the main component (containing the monosulfonic acid product of the compound of Formula (2)) (a dye component to use in the present invention) as a reddish powder.

The dye mixture was analyzed by high performance liquid chromatography (HPLC) to determine an area ratio. The area ratio by the HLPC revealed that the dye mixture contained the disulfonic acid product of the compound represented by Formula (2) in the content of 85% or more and the monosulfonic acid product in that of 10% or less.

The dye mixture was stirred in 5 times by mass of methanol at a room temperature for 1 hour, filtered, washed with methanol, and dried to obtain 15.6 parts of the sodium salt of anthrapyridone disulfonic acid of Formula (1) of the present invention as a brightly red crystal (M1) ($\lambda$.max=533 nm in water) which contained an inorganic salt in very small amount.

The sodium salt was analyzed by high performance liquid chromatography (HPLC) to determine an area ratio. The area ratio by the HLPC revealed that the sodium salt thus obtained contained the sodium anthrapyridone disulfnate represented by Formula (1) in the content of 95% or more and the sodium monosulfonate of the anthrapyridone compound represented by Formula (2) in that of 10% or less.

According to the results of an inorganic analysis, the content of NaCl is 0.1% and that of $Na_2SO_4$ is 0.2%.

Example 2

15.2 parts of the anthrapyridone compound of Formula (2) was added gradually in 64.2 parts of 98% sulfuric acid held in a reaction vessel under ice cooling at a temperature of 20° C. or below, and then stirred at a temperature of 15–20° C. for 1 hour to dissolve. 42.1 parts of 28% fuming sulfuric acid was added dropwise gradually at a temperature of 20° C. or below under ice cooling to sulfonate at 15–20° C. The reaction solution was added in 300 parts of ice water to stir. A deposited crystal was filtered to get a wet cake, which was stirred with 300 parts of water to dissolve. The solution was neutralized with 25% aqueous sodium hydroxide solution and then filtered to remove a small amount of undissolved product. 30 parts of sodium chloride was added in the mother liquor to salt out, followed by stirring for 1 hour, filtering, and drying to obtain a dye component to use in the present invention as a reddish powder.

The dye component was stirred in 5 times by mass of 70% aqueous methanol solution at a room temperature for 1 hour, filtered, washed with methanol, and dried to obtain 15.3 parts of the sodium salt of anthrapyridone disulfonic acid of Formula (1) of the present invention as a brightly red crystal ($\lambda$.max=533 nm in water) which contained an inorganic salt in very small amount.

According to analyses by HPLC, the sodium salt thus obtained contained the sodium monosulfonate of the anthrapyridone compound represented by Formula (2) in the content of 0.2% and the sodium anthrapyridone disulfnate represented by Formula (1) in that of 95.0%.

An inorganic analysis showed that the sodium salt contained NaCl and $Na_2SO_4$ in their respective contents of 0.2% and 0.1%.

Example 3

(1) Preparation of an Ink

The liquid having a constitution as described below in Table 1 was prepared and then filtered through a 0.45 $\mu$m membrane filter to obtain a water-based ink composition for ink-jetting. The ink composition deposited no crystal after a 6 month storage, and so was good in storage stability.

TABLE 1

| | |
|---|---|
| Dye of the present invention (The compound of Example 1: M1)(note) | 4.5 parts |
| Water | 75.5 parts |
| N-methylpyrrolidine-2-one | 5.0 parts |
| Etylene Glycol | 5.0 parts |
| Glycerin | 5.0 parts |
| Urea | 5.0 parts |
| Total | 100.0 parts |

(note)
The content of the monosulfonic acid product: 0.5% or less (as determined by HPLC at the above condition); The total content of sodium chloride and sodium sulfate: 1% by mass or less; The solubility in pure water(ion exchanged water): 100 g/L (25° C.)

(2) Ink-jet Printing

By using an ink-jet printer (Trade name: BJ F600, made by Canon KK), ink-jet recordings were done with a monochrome and a blend color (red, blue, green) on a commercially available plain paper (PB PAPER, made by Canon KK) and a glossy film (a photo glossy film, HG-201, made by Canon KK) having a dye-acceptable layer.

(3) Hue and Vividness of a Recorded Image

A recorded paper was subject to color determination using the colorimeter (GRETAG SPM50, made by GRETAG Co.) to calculate L*, a*, b* values. Hue was evaluated by the comparison with a color sample of the standard magenta in JNC's JAPAN Color, and vividness was evaluated from a value calculated by the formula:

$$C^* = ((a^*)^2 + (b^*)^2)^{1/2}$$

The results are shown in Table 2.

(4) Light Fastness of a Recorded Image

A carbon arc fade meter (made by Suga Testing Machine Co.) was used to irradiate carbon arc on the recorded papers for 40 hours. A change in grade between before and after the irradiation was judged according to JIS blue scale. A color difference(ΔE) between before and after the irradiation also was measured by the above color determination system. The results are shown in Table 2.

TABLE 2

|  | Hue | | Vividness | | Light fastness |
| --- | --- | --- | --- | --- | --- |
|  | L* | a* | b* | C* | Grade(ΔE) |
| standard magenta | 46.3 | 74.4 | −4.4 | 74.5 |  |
| Magenta ink of Ex. 3 | 46.6 | 78.9 | −14.6 | 80.2 | 5(14.5) |

Table 2 reveals that the ink composition of Example 3 in the present invention is excellent because it is similar to, the standard magenta in hue and vividness and shows a small color difference between before and after the irradiation in light fastness test on a coated paper. The dye component to use in the present invention is an excellent dye for ink-jetting because it has a water-solubility of about 100 g/L, and can prepare a high concentration of ink.

Example 4 and Comparative Example 1

(1) Preparation of Ink Compositions

The dye (M1) of the present invention was used to prepare a magenta ink in the same way as done in Example 3. The dye (M2:C.I.Acid Red 82) as described in JP Laid-Open No.195775/1982 was used to prepare a magenta ink for an comparative example, wherein this ink was adjusted to coincide with the above ink in optical density.

The inks attached to the printer (Trade name: BJ F600, made by Canon KK) were used for an yellow ink and a cyan ink. The cyan ink comprised a water-soluble phthalocyanine dye.

(2) Ink-jet Printing

By using an ink-jet printer (Trade name: BJ F600, made by Canon KK), ink-jet printings were done with a monochrome and a blend color (red, blue) on a commercially available glossy film (a photo glossy film, HG-201, made by Canon KK). The printings also were done with yellow, cyan and their blend color for reference.

(3) Hue and Vividness of a Recorded Image

Color determination using the colorimeter (SPM50, made by GRETAG Co.) was done in the same way as described in Example 3(3) to calculate a*, b*, C* values. The results are shown in Table 3 and FIG. 1.

(4) Outdoor Exposure Fastness Test

A printed recording paper was stuck on an outdoor wall out of direct sunshine for 1 week to test the outdoor exposure fastness. The above color determination system was used to measure a color difference (ΔE) between before and after the outdoor exposure. The results are shown in Table 3.

(5) Water Fastness of a Recorded Image

A printed recording paper was put in a 100° C. vapor saturated vessel for 60 minutes to assay water(vapor) fastness. Assay results were represented as described below.

(Breeding from a printed color region to an unprinted white region was judged according to the following standard)

○: no visible breeding
Δ: a visibly middle breeding
X: a visibly large breeding

TABLE 3

| Red(R) magenta(M) blue(B) yellow(Y) cyan(C) green(G) | | | | | | |
| --- | --- | --- | --- | --- | --- | --- |
|  | (Y + M) | (M) | (C + M) | (Y) | (C) | (Y + C) |
| (Hue and Vividness) | | | | | | |
| a* Ex. 4 | 63.8 | 78.9 | 34.0 | −1.5 | −38.7 | −76.8 |
| Comp. 1 | 61.1 | 77.6 | 23.8 | | | |
| b* Ex. 4 | 47.4 | −14.6 | −62.8 | 91.9 | −56.2 | 17.2 |
| Comp. 1 | 60.1 | 4.4 | −57.3 | | | |
| C* Ex. 4 | | 80.2 | | | | |
| Comp. 1 | | 77.7 | | | | |
| (Outdoor exposure fastness, ΔE) | | | | | | |
| Ex. 4 | 4.0 | 2.2 | 25.0 | 2.0 | 25.7 | 41.0 |
| Comp. 1 | 5.2 | 7.9 | 35.2 | | | |
| (Water fastness) | | | | | | |
| Ex. 4 | ○ | ○ | Δ | ○ | ○ | ○ |
| Comp. 1 | X | X | X | | | |

Table 3 reveals that the magenta color of Comparative Example 1 was yellowish and different from the standard magenta color because its b* value was positive and that the magenta color to use in the present invention was a nearly ideal magenta color with appropriately bluish tone because its b* value was −14.6. Further its blend color with the cyan was blue having the b* value of a of −62.8, which is more strongly bluish. The a* values and the b* values in Table 3 are plotted on a chromaticity diagram as illustrated in FIG. 1 to reveal that the magenta of the present invention has a larger extent in the region of positive a* values and negative b* values than the magenta of Comparative Example 1 and so can give a greater number of blend colors having color tone involved in this region. Further, the magenta of the present invention is found out to have higher vividness from its C* value as a criterion of vividness. The above results shows that the ink composition of Example 4 has a higher vividness and an enlarged range of colors, and has especially superiority in B(blue) and M(magenta).

The magenta color to use in the present invention is superior to Comparative Example 1 because the color change in outdoor exposure fastness test is smaller than that of Comparative Example 1 and especially, have considerably superiority in magenta color and blend blue color.

The magenta color to use in the present invention and its blended colors of red and blue were better in water fastness.

Example 5 and Comparative Example 2

(1) Preparation of an Ink Composition

A magenta ink composition was prepared in the same way as in the ink composition of Example 3 except that 3.8 parts of the dye (M1) containing the compound of Formula (1) and 76.2 parts of water were used instead. The ink (M3) (confirmed to be an azo dye) for the below printer was used for Comparative Example 2. The cyan ink composition also was prepared in the same way as in Example 3 except that the below copper phthalocyanine dyes were used instead.

Cyan Dyes
C1: C.I. Direct blue 199 (copper phthalocyanine dye)
C2; C.I. Reactive blue 71 (copper phthalocyanine dye)

(2) Ink-jet Printing

By using an ink-jet printer (Trade name: BJ F600, made by Canon KK), ink-jet printings were done with a monochrome and a blend color (blue) on a commercially available plain paper (Trade name: PB PAPER, made by Canon KK) and a glossy film(a photo glossy film, HG-201, made by Canon KK).

(3) Light Fastness of a Recorded Image

A carbon arc fade meter (made by Suga Testing Machine Co.) was used to irradiate carbon arc on the recorded papers for 40 hours. A color difference ($\Delta E$) between before and after the irradiation was measured by the colorimeter (SPM50, made by GRETAG Co.). The results are shown in Table 4.

TABLE 4

| No. | plain Paper | glossy film | note |
|---|---|---|---|
| (Example 5) | | | |
| 1-1 | 12.0 | 17.8 | magenta M1 only |
| 1-2 | 9.0 | 17.7 | blue(a blend color of magenta M1 with cyan C1) |
| 1-3 | 9.7 | 15.2 | blue(a blend color of magenta M1 with cyan C2) |
| (Comparative Example 2) | | | |
| 2-1 | 24.2 | 54.6 | magenta M3 only |
| 2-2 | 19.4 | 57.6 | blue(a blend color of magenta M3 with cyan C1) |
| 2-3 | 18.6 | 54.8 | blue(a blend color of magenta M3 with cyan C2) |
| (Data common to Example 5 and Comparative Example 2) | | | |
| 3-1 | 6.4 | 7.6 | cyan C1 only |
| 3-2 | 6.4 | 8.5 | cyan C2 only |

In Table 4, No.1-1 to 1-3 are the test samples made from the ink compositions of the present invention, and No.2-1 to 2-3 are the comparative samples. All the data in No.1-1 to 1-3 are superior to those in No.2-1 to 2-3. In comparison between No.1-1 and No.2-1, No.1-1 does not give a big difference in color difference between a plain paper and a glossy film, whereas No.2-1 brings a larger difference in color difference on a glossy film than in that on a plain paper.

In comparison between the magenta dye only and a combination with the copper phthalocyanine cyan dye, both No.1-2 and No.1-3 of Example 5 stand between the magenta only and their respective cyan only in $\Delta E$ value, while both No.2-2 and No.2-3 are beyond any of the magenta only and their respective cyan only in $\Delta E$ value on the glossy film. This fact means that a combination with the copper phthalocyanine cyan dye, which may bring a large decrease of light fastness depending on a recording paper (film) in case of the dye of Comparative Example 2, can inhibit a decrease of light fastness in the case of the dye of the present invention.

Furthermore, in consideration of a balance in $\Delta E$ value among magenta, cyan and blue, the combinations in Example 5 have their respective small deviations in $\Delta E$ value among them, whereas those in Comparative Example 2 have their large deviations. Therefore, the combinations in Comparative Example 2 bring large difference on the printed images, whereas those in Example 5 of the present invention can lighten gradually and uniformly the whole printed images without large difference brought about on the printed image. There is especially shown a significant difference on a glossy film suitable for printing an image.

Example 6 and Comparative Example 3, 4, 5

(1) Preparation of Ink Compositions

The dye (M1) of the present invention was used to prepare a magenta ink for an example in the same way as done in Example 3. The dye (M2:C.I.Acid Red 82) as described in JP Laid-Open No.195775/1982 was used to prepare a magenta ink for Comparative Example 3; the dye (M4) as described in JP Laid-Open No.74173/1984 and represented by below Formula (3) was used to prepare a magenta ink for Comparative Example 4; and the dye (M5) as described in JP Laid-Open No.74173/1984 and represented by below Formula (4) for Comparative Example 5 was used to prepare respective magenta ink for Comparative Examples, wherein these magenta inks were adjusted to coincide with the above ink composition in optical density.

(3)

(4)

The inks attached to the printer (Trade name: BJ F850, made by Canon KK) were used for an yellow ink and a cyan ink. The cyan ink comprised a water-soluble phthalocyanine dye.

(2) Ink-jet Printing

By using an ink-jet printer (Trade name: BJ F850, made by Canon KK), ink-jet printings were done with a monochrome and a blend color (red, blue) on a commercially available glossy film (a photo glossy film, HG-201, made by Canon KK). The printings also were done with yellow, cyan and their blend color for reference.

(3) Hue and Vividness of a Recorded Image

Color determination using the colorimeter (GRETAG SPM50, made by GRETAG Co.) was done in the same way as described in Example 4(3) to calculate a*, b*, C* values. The results are shown in Table 5 and FIG. 2.

TABLE 5

| | Red(R) magenta(M) blue(B) yellow(Y) cyan(C) green(G) | | | | | |
|---|---|---|---|---|---|---|
| | (Y + M) | (M) | (C + M) | (Y) | (C) | (Y + C) |
| (Hue and Vividness) | | | | | | |
| a* Ex. 6 | 71.4 | 78.8 | 37.2 | -3.0 | -50.5 | -85.8 |
| Comp. 3 | 67.9 | 74.4 | 24.1 | | | |
| Comp. 4 | 59.7 | 65.3 | 17.1 | | | |
| Comp. 5 | 63.9 | 71.5 | 17.2 | | | |
| b* Ex. 6 | 58.7 | -12.4 | -62.4 | 89.9 | -49.1 | 20.8 |
| Comp. 3 | 73.0 | 5.2 | -54.8 | | | |
| Comp. 4 | 89.2 | 13.1 | -51.9 | | | |
| Comp. 5 | 64.6 | 4.7 | -49.3 | | | |
| C* Ex. 6 | | 79.8 | | | | |
| Comp. 3 | | 74.6 | | | | |
| Comp. 4 | | 66.6 | | | | |
| Comp. 5 | | 71.7 | | | | |

Table 5 reveals that the magenta colors of Comparative Example 3, 4 and 5 were yellowish and different from the standard magenta color because their b* values are positive, that the magenta color of the present invention was a nearly ideal magenta color which is appropriately bluish because its b* value was -12.4, and further that its blended color with the cyan is blue color having b* value of -62.4, namely stronger blue. The a* values and the b* values in Table 5 are plotted on a chromaticity diagram as illustrated in FIG. 2 to reveal that the magenta of the present invention has a larger extent in the region of positive a* values and negative b* values than the magentas of Comparative Example 3, 4 and 5 and so can give a greater number of blend colors having hue involved in this region. Further, the magenta of the present invention is found out to have a higher C* value as a criterion of vividness. The above results shows that the ink composition of Example 6 has a higher vividness and a wider range of color rendering, and has especially superiority in R(red), B(blue) and M(magenta).

Industrial Applicability

The anthrapyridone compound of the present invention is excellent in water-solubility, and characterized by having a good ability to filter through a membrane filter in the production process of an ink composition. The compound is highly safe for a living body. Furthermore, the ink composition of the present invention using the anthrapyridone compound does not show a crystal deposition after a long storage, a change in property(an aging change in viscosity, surface tension and soon) and a color change, so that it has good storage stability. The ink composition of the present invention, when used as a magenta ink for ink-jet recording, can provide a printed matter with excellent grade in light fastness, outdoor exposure fastness and water fastness. Furthermore, the composition also, when used together with a yellow, cyan or black dye, can give an ink-jet recorded matter that is excellent in light fastness, outdoor exposure fastness and water fastness. The composition, when used to apply to an information recording paper and especially to an information paper having an ink-acceptable layer, can bring a remarkable effect. The composition also can provide a vivid printed surface as well as an ideal magenta color. The composition, when used together with a yellow or cyan ink, can provide a wide visible ray range of color tone.

Therefore, the compound of the present invention is very useful for an ink-jet recording magenta ink.

What is claimed is:

1. A water-based magenta ink composition comprising the anthrapyridone disulfonic acid represented by Formula (1):

(1)

or the salt thereof.

2. A water-based magenta ink composition comprising the dye mixture obtained by sulfonating the anthrapyridone compound represented by Formula (2):

(2)

and comprising the disulfonic acid product of the anthrapyridone compound represented by Formula (2) or the salt thereof and the monosulfonic acid product of the anthrapyridone compound represented by Formula (2) or the salt thereof.

3. A water-based magenta ink composition according to claim 1, wherein said composition contains water and an organic solvent.

4. A water-based magenta ink composition according to claim 1 or 3, wherein said composition is an ink for ink-jet recording.

5. A method for ink-jet recording comprising ejecting ink droplets responding to record signals to record onto a recording material, wherein the ink comprises the water-based magenta ink composition according to claim 1 as a magenta ink.

6. A method for ink-jet recording comprising ejecting ink droplets responding to record signals to record onto a recording material, wherein the ink comprises the water-based magenta ink composition according to claim 1 as a magenta ink and a water-based cyan ink composition containing a water-soluble metal phthalocyanine dye as a cyan ink.

7. A method for ink-jet recording according to claim 5 or 6, wherein said recording material is a fiber material having polyamide groups and the fiber material is treated by heat after said ink droplets are ejected on it.

8. A method for ink-jet recording according to claim 5 or 7, wherein said recording material is an information transmission sheet.

9. A method for ink-jet recording according to claim 8, wherein said information transmission sheet is a surface-finished sheet.

10. An ink-jet printer that comprises being equipped with a container holding the water-based magenta ink composition according to claim 4 or 3 and a container holding a water-based cyan ink composition containing a water-soluble metal phthalocyanine dye.

11. A water-based magenta ink according to claim 2, wherein said disulfonic acid product of the anthrapyridone compound represented by Formula (2) or the salt thereof has a content of 85% or more and said monosulfonic acid product of the anthrapyridone compound represented by Formula (2) or the salt thereof has a content of 10% or less, when determined from their area ratios by high performance liquid chromatography.

12. A water-based magenta ink according to claim 11, wherein said disulfonic acid product of the anthrapyridone compound represented by Formula (2) or the salt thereof has a content of 90% or more and said monosulfonic acid product of the anthrapyridone compound represented by Formula (2) or the salt thereof has a content of 5% or less, when determined from their area ratios by high performance liquid chromatography.

13. A water-based magenta ink according to claim 2 comprising an inorganic salt having a content of 1% by mass or less.

14. A water-based magenta ink composition according to claim 2 or 13, wherein one of said disulfonic acid products of the anthrapyridone compound represented by Formula (2) is the anthrapyridone disulfonic acid represented by Formula (1).

* * * * *